April 3, 1956

E. S. POMYKALA 2,740,693

SEPARATION AND PURIFICATION OF NITROGEN AND
OTHER INSOLUBLE GASES FROM FLUE GASES

Filed March 8, 1950

Edmund S. Pomykala INVENTOR

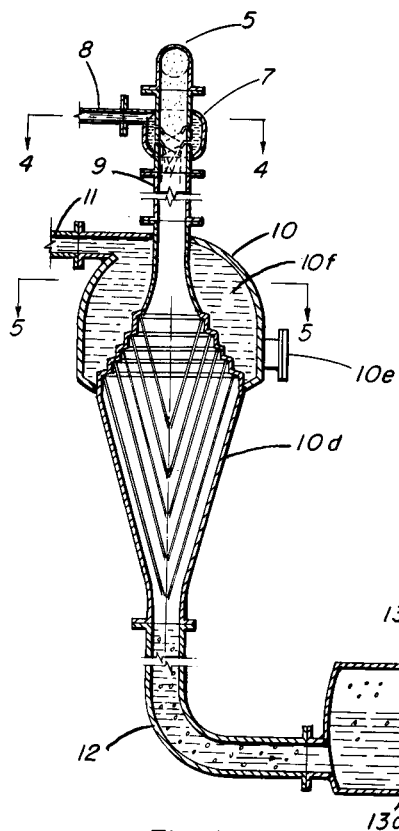
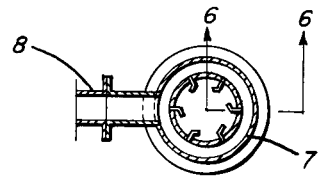
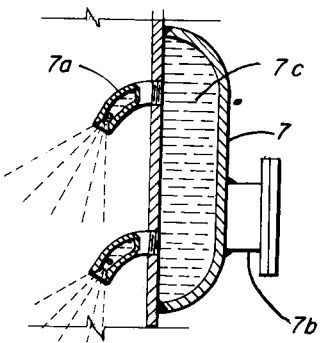
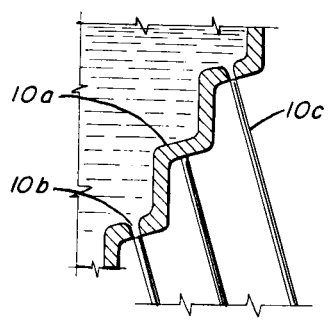
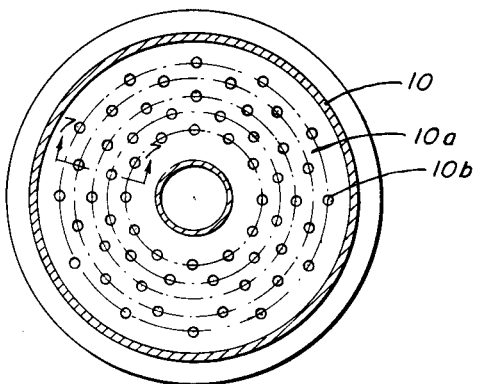
Fig. 2.
Fig. 4.
Fig. 6.
Fig. 7.
Fig. 5.
INVENTOR
Edmund S. Pomykala

United States Patent Office 2,740,693
Patented Apr. 3, 1956

2,740,693

SEPARATION AND PURIFICATION OF NITROGEN AND OTHER INSOLUBLE GASES FROM FLUE GASES

Edmund S. Pomykala, Mobile, Ala.

Application March 8, 1950, Serial No. 148,492

2 Claims. (Cl. 23—220)

This invention relates to method and apparatus for separation and purification of nitrogen and other insoluble atmospheric gases from flue gases, and their use after suitable treatment for prevention of spontaneous combustion in large coal piles. It concerns primarily plants which consume great amounts of coal, such as industrial plants and public utilities. But the ramifications and scope of this invention are much broader. It can also be used with advantage as a step in manufacture of synthetic ammonia and as a new system for elimination of smoke nuisance in cities from our large combustion plants.

Flue gases from industrial and power plants are mostly products of combustion of fuel and air, being mainly composed of nitrogen, carbon dioxide, steam, oxygen, with small amounts of carbon monoxide, sulphur dioxide, free carbon, tarry hydrocarbons, and other minor constituents. An average approximate quantitative composition would be:

|  | Percent |
|---|---|
| $N_2$ | 79. |
| $CO_2$ | 14.5 |
| (Steam) $H_2O$ | 3 |
| $O_2$ | 2 |
| CO | 0.2 |
| The rare inert gases | 1.0 |
| Argon |  |
| Neon |  |
| Helium |  |
| Krypton |  |
| Xenon |  |
| $SO_2$ | Trace |
| C | Trace |

At present these flue gases are discharged into the atmosphere where they pollute the air and are a major nuisance in our large industrial cities. It is proposed to eliminate this nuisance to a large extent. It will be shown that these gases can be purified at a small cost and some of the valuable constituents like nitrogen reclaimed. One of the uses being prevention of spontaneous combustion in large coal piles. Such separated nitrogen can also be used very cheaply for manufacture of synthetic ammonia, and other chemicals.

In the present practice coal for large establishments such as industrial plants and public utilities is stored in the open in large piles about 12 feet high as a reserve for contingencies. Generally it is laid on concrete slabs. Due to oxidation by oxygen of the air the coal gets heated, particularly in the interior, where air circulation and heat convection is negligible. When this heating reaches critical value or ignition point, fire gets started. These fires generally are deeply placed within the body of the coal. They are somewhat difficult to spot, and also difficult to extinguish. One of the objects of this invention as stated above is to prevent these fires getting started by the simple medium of circulating cooled nitrogen gas obtained from flue gases through the coal pile. The function of nitrogen in nature is to moderate or slow down the oxidizing action of oxygen. The greater the proportion of nitrogen the slower the oxidation. The advantage of using nitrogen for fire prevention is that it is non-poisonous; it is inactive and being slightly lighter than air it tends to rise in a slow upward and outward movement through the coal pile, displacing the air in the voids and preventing oxidation of the coal, and therefore all spontaneous combustion.

The advantage of using this method is that not only that combustion is prevented but all oxidation of the coal is minimized giving a greater heat content of the coal to the operators. This last item has considerable economic value as some coals deteriorate in storage anywhere from 2 to 10% over a period of six months.

A further important object of the invention is to provide a method for elimination of smoke nuisance in our large industrial cities. The flue gases discharging into the atmosphere are the cause of a great deal of the soot which settles on buildings and makes them unsightly and dirty. Some of the components like carbon dioxide and sulphur dioxide when mixed with moisture of the air form acids which promote corrosion of metals and disintegration of certain types of building stone. It is claimed by some authorities that the national annual loss due to smoke is about 2 billion dollars. Smoke in addition has a bad effect on the health of the inhabitants. Some authorities even contend that the pollution of city atmospheres by poisonous smokes induces or promotes pulmonary diseases such as pneumonia, tuberculosis and cancer of throat and lungs.

A still further object of the invention is to provide a step in the process of cheap production of synthetic ammonia. The synthetic process is based on the direct synthesis of ammonia from its elements

$$N_2 + 3H_2 \rightleftarrows 2NH_3 + 24,200 \text{ cal.}$$

This is accomplished under high temperature and pressure with a suitable catalyst. The nitrogen, one of the constituents, is usually obtained by evaporation of liquid air, or from producer gas, which is mainly a mixture of nitrogen and carbon monoxide.

The object of this invention is to provide a cheaper source of nitrogen for the process from waste flue gases from combustion plants. Nitrogen from flue gases could also be used in making ammonia by the cyanamide process

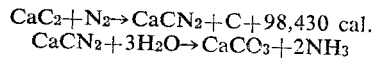

$$CaC_2 + N_2 \rightarrow CaCN_2 + C + 98,430 \text{ cal.}$$
$$CaCN_2 + 3H_2O \rightarrow CaCO_3 + 2NH_3$$

Still another object of the invention is to provide a step in the cheap separation of inert gases particularly argon. Argon is now separated from liquid air by fractional distillation. Argon boiling point −185.7° C.; oxygen boiling pt. −183° C.; nitrogen boiling point −195.8° C. Since argon and oxygen have such close boiling points, they separate out together. There may be further fractional distillation until 65% argon is reached. The remaining oxygen is removed by adding to the mixture exact quantity of hydrogen needed to combine with it, and burning the oxygen to water. Since in this proposed new method oxygen is mostly removed from the mixed gases, concentration and distillation can be carried out more easily and cheaply. Argon and the remaining inert gases can also be produced as by a product of the cyanamide ammonia process. Since nitrogen goes mostly into combination the remaining inert gases can be more easily concentrated and separated by fractional distillation.

Another object of this invention is the separation and salvage of tarry hydrocarbons and other light hydrocarbons now freely escaping into the air with flue gases and so polluting the atmosphere.

Still another object is to provide a suitable plant and apparatus to accomplish the above process. Some components of which may serve other useful functions, such as highly efficient jet condensers, and air ejectors in power plant operation.

With these and other objects and advantages in view, the details of construction and operation are further illustrated in the accompanying drawings wherein:

Figure 2 is a vertical sectional view taken on lines 2—2 in Fig. 1, showing water jet gas ejector, hydraulic column gas compressor, and gas separator.

Figure 4 is a sectional view of water vaporizer taken on lines 4—4 in Fig. 2.

Figure 5 is a sectional plan view of water chamber of hydraulic jet gas ejector taken on lines 5—5 in Fig. 2.

Figure 6 is a vertical sectional view on an enlarged scale, of hydraulic chamber of the water vaporizer taken on lines 6—6 in Fig. 4.

Figure 7 is a sectional view on an enlarged scale showing interior diaphragm and nozzle construction of hydraulic jet gas ejector taken on lines 7—7 in Fig. 5.

In all views similar numerals or numerals and letters designate similar parts.

Figures 1, 8:
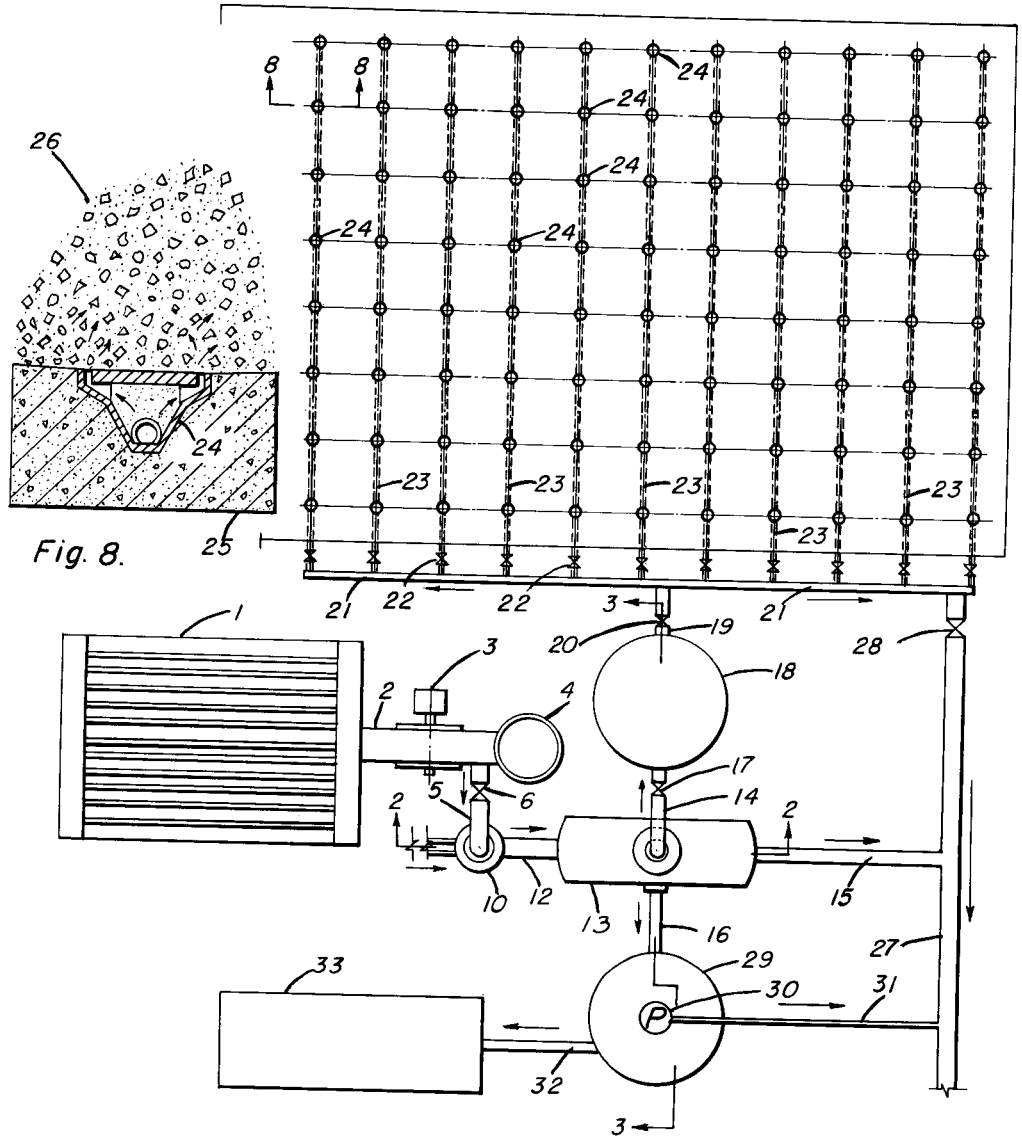
Figure 1 is a general schematic plan of the apparatus.
Figure 8 is a partial vertical sectional view through bottom of coal pile showing nozzle for diffusing nitrogen gas.
Figure 3:
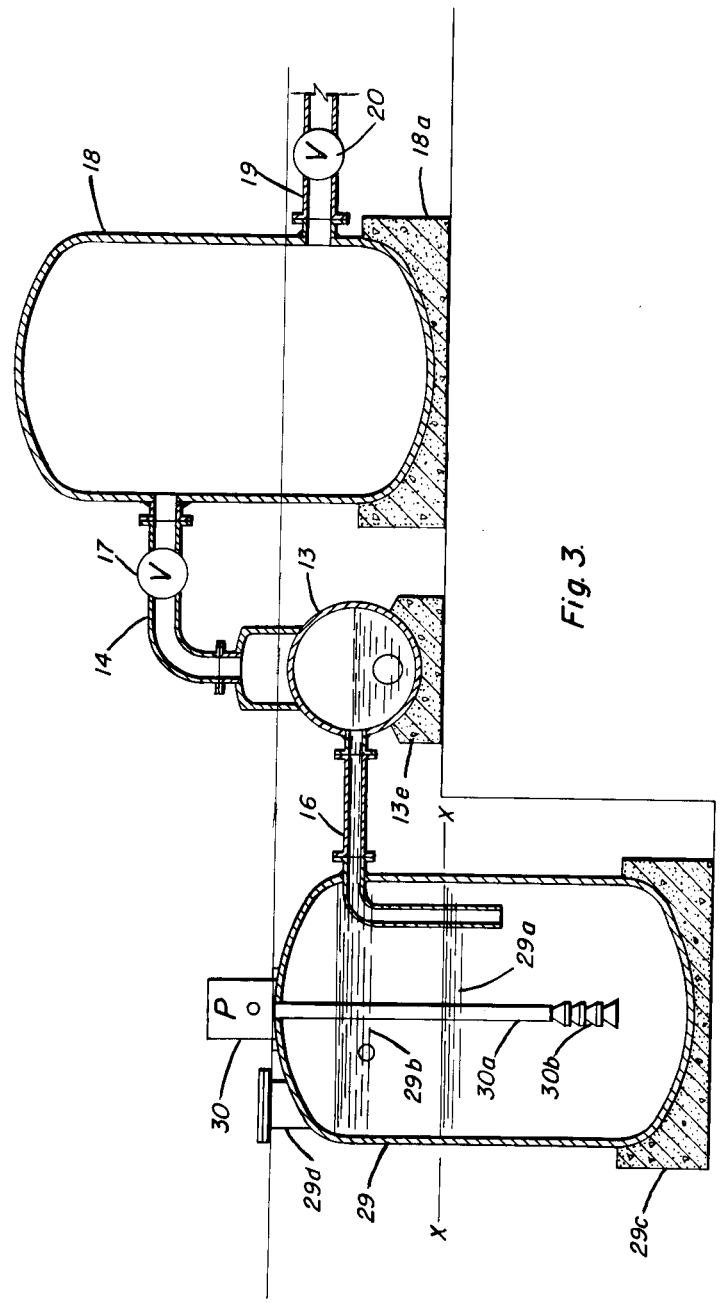
Figure 3 is a vertical sectional view taken on lines 3—3 in Fig. 1, showing hydrocarbon water separator, gas separator, and nitrogen receiver.

Numeral 1 designates any standard fire box for combustion of fuel.

2 is a flue for combustion gases.

3 is induced draft fan.

4 is main chimney, which may be partially used or dispensed with entirely. The combustion gases are taken from the flue 2 and routed through duct 5 and valve 6 into the flue gas ejection and separation system. After leaving duct 5 the combustion gases are first routed through water vaporizer 7. Here the combustion gases are washed with a fine spray of water. The high heat content of the combustion gases vaporizes part of the sprayed water, thereby appreciably cooling the mixture. The water 7C for this treatment is fed from an outside source through pipe 8 into the water chamber of vaporizer 7. This water is under pressure and at certain times may be preheated to aid evaporation. The operation is dependent primarily on the heat of the flue gases. The purification could be carried out with cold gases but then water vapor would have to be supplied in the form of low pressure steam. In normal operation the water for this treatment is directed through nozzles 7a (Fig. 6), and sprayed with a fine mist into main mixing chamber 9. This may be done in any suitable manner. The method shown schematically consists of nozzles 7a being arranged regularly in a double row around mixing chamber 9. The nozzles point downwards and make a small angle in two planes, the object being to propel the combustion gases downwards and induce in them a whirling action. The spray is generated in a ball guarded aperture of nozzle 7a, but it may be accomplished in any other suitable manner. The water chamber of vaporizer is provided with cleanout handhole 7b which is always sealed in operation. Since the combustion gases as they issue from duct 5 are still very hot (temperature about 400° F.) they immediately vaporize part of the sprayed water in chamber duct 9. The mixture of combustion gases and newly formed water vapor is drawn downwards into the gas ejector 10. This is of novel design and consists of hemispherical domelike outer surface for the water chamber, welded or suitably fastened by other means to the main chamber 10d of the ejector. Water chamber is furnished with clean out handhole 10b. Water 10f carrying a small proportion of sodium hydroxide or calcium hydroxide in solution is led through pipe 11 into the water chamber of the ejector 10. This water is under considerable pressure, about 60 lbs. per square inch, is directed angularly downward in a multiple series of small diameter water jets or streams. These are directed through small nozzles 10b (Fig. 7) formed in the inner lining or corrugated diaphragm 10a of the water chamber.

The water jets are all contained in the main condensing chamber 10d. The combustion gases as they flow from vaporizer 7, through mixing chamber 9 and on to condensing chamber 10d are rapidly cooled, and are dragged and pushed along by the molecules of steam which drive for the condensation chamber. The combustion gases become entrained by the combined molecular action of the water vapor and the power of the jets 10c. The mixture of condensed steam, water of the jets, and original combustion gases are ejected from condensing chamber 10d into tube or constricted column 12. Tube 12 may be lined with oxides of manganese and copper to act as a catalyzer as shown in my U. S. patent application for neutralizing exhaust gases, Ser. 138,831, the purpose being to eliminate carbon monoxide as far as possible by inducing reaction with oxygen coming down with the flue gases $$2CO + O_2 = 2CO_2$$

Carbon dioxide is eliminated partly in solution (this gas being very soluble in water; approximately one volume of the gas is soluble in one volume of water at room temperature), and partly by chemical reaction with sodium hydroxide in water, the reaction being:

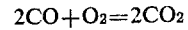

$$H_2O + CO_2 + 2NaOH = Na_2CO_3 + 2H_2O$$

The solubility of carbon dioxide is greatly aided by compression, the solubility varying directly with compression. The system shown lends itself to this method by having a high water column 12, say about 40 feet or more. The gases in tank 13 can be compressed to two atmospheres, and the solubility of the gases accordingly increased. This would require some rearrangement of equipment shown, such as disconnection of tank 29 from tank 13, and connecting to still another separator tank between sections of pipe 15 at a high level. This remark is made merely to show the various possibilities.

For the purpose shown, namely to purify nitrogen for use in prevention of fires in coal piles, high compression of the gases is not required. The mixture of flue gases and water vapor coming down water column 12 and into tank 13 are now separated—carbon dioxide partly in solution and partly reacted with sodium hydroxide is ejected with waste water mostly through pipe 15. Water vapor in the original flue gases and additional formed in vaporizing column 9 is condensed and so eliminated.

Carbon monoxide and oxygen originally present in small proportion have partially reacted in column 12 and partially have gone into solution under slight pressure. These gases are however only slightly soluble in water; the solubility of carbon monoxide being 2.5 parts, and oxygen 3.5 parts of gas, in 100 parts of water at standard pressure and room temperature. However in both cases after treatment the total amount present is reduced to a negligible value.

Sulphur dioxide originally present as a trace is eliminated entirely since this gas is very soluble in water. However there is a further refinement, sulphur dioxide may be more advantageously eliminated and also act as an agent for eliminating dissolved oxygen by chemical reaction with sodium hydroxide. This reagent has already been proposed for eliminating carbon dioxide. To serve simplicity it may also be used to further eliminate sulphur dioxide and dissolved oxygen, the reaction being as follows:

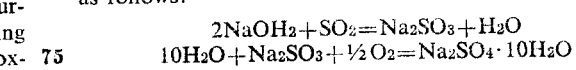

$$2NaOH_2 + SO_2 = Na_2SO_3 + H_2O$$
$$10H_2O + Na_2SO_3 + \tfrac{1}{2}O_2 = Na_2SO_4 \cdot 10H_2O$$

Oxygen may be further reduced if desirable (particularly where a high degree of purity of nitrogen is required, as for the manufacture of ammonia, or for further separation of inert gases such as argon or neon from remaining nitrogen) by adding suitable reducing agents such as ferrous hydroxide or sodium sulphite to treating water for reacting with and removing traces of dissolved oxygen $$2Fe(OH)_2 + \tfrac{1}{2} O_2 = Fe_2O_3 + 2H_2O$$

Nitrogen now in a highly purified state (being soluble only about 2 parts per 100 parts of water) is released from the water together with the rare inert gases, is taken up the gas dome 13b into pipe 14 through valve 17 into storage tank 18.

The hydrocarbons are immiscible in water—they float on top and are drawn off through pipe 16 into tank 29. Pipe 16 enters tank 29 and makes a deep bend, discharges its contents under lowest liquid operating level so as to provide a water seal for nitrogen in the separating tank 13. The hydrocarbons together with some waste water which entered pipe 16, now separate out in tank 29, waste water being 29a, and floating hydrocarbons 29b above line X—X. The hydrocarbons are drawn off at the top of the tank 29 through pipe 32, and may be stored in drum filling building 33 for further treatment. The waste water from tank 29 is ejected through deep well pump 30. The waste water is taken up through intake 30b, tube 30a and ejected through pipe 31 into main sewer 27. In tank 29, 29c is foundation on which it rests and 29d is manhole for general clean out.

In tank 13, liquor 13c, contains dissolved flue gases including nitrogen with traces of admixtures which are released; and indicated as 13d. The film of hydrocarbons is drawn off through pipe 16 as indicated above. Baffle 13a is provided to prevent floating hydrocarbons going through main waste drain 15, and polluting the waste water containing a trace of carbon being discharged to the main sewer. Tank 13 rests on foundation block 13e.

Nitrogen in a cooled and purified state is stored in tank 18, resting on foundation 18a. This is schematic only as it would be more desirable to store it in a floating gas container. If desired the gas may be compressed and cooled further by machinery available on the market. But preferably it is compressed hydraulically as indicated early in this description so eliminating moving parts to a minimum. The nitrogen is released from tank 18 as needed through pipe 19 and valve 20 into distributing piping 21 valves 22 and final feed pipes 23 buried in concrete slab, whence the gas is diffused through expansion nozzles 24 into the body of the coal 26 through which it seeps slowly upwards displacing any oxygen that may be present, and so preventing oxidation and spontaneous combustion.

28 is a valve for discharging any rain water which may have seeped into the distributing piping.

Having described the general features of the process and apparatus of this invention, it is believed others skilled in the art may make changes in details without departing from the spirit of this invention or the scope of the appended claims.

I claim:

1. In the recovery of insoluble gases comprising nitrogen from flue gases, the process which comprises spraying hot flue gases with a fine mist of water to cool the gases and substantially to saturate them with water vapor, entraining the so-treated gases in the jets of a gas ejector, said jets being fed with a dilute aqueous solution of an alkali, ejecting the resulting aqueous mixture downwardly in the form of a constricted column sufficiently long to produce superatmospheric pressure on the aqueous mixture, discharging the aqueous mixture into an enlarged separating zone maintained under superatmospheric pressure, thereby slowing the flow and causing release of the entrained insoluble gases, and while under superatmospheric pressure decanting off hydrocarbon impurities, separating an aqueous liquid containing dissolved impurities and recovering the insoluble gases including nitrogen from the top of said separating zone.

2. The process of claim 1 wherein the aqueous mixture passing downwardly through said constricted column is contacted with a catalytic material consisting of the oxides of manganese and copper capable of causing the carbon monoxide in the aqueous mixture to react with the oxygen contained therein in accordance with the equation $2CO + O_2 = 2CO_2$.

References Cited in the file of this patent

UNITED STATES PATENTS

| Number | Name | Date |
|---|---|---|
| 888,119 | Richards | May 19, 1908 |
| 990,278 | Le Blanc | Apr. 25, 1911 |
| 1,208,658 | Rigby | Dec. 12, 1916 |
| 1,239,516 | Phillip | Sept. 11, 1917 |
| 1,295,635 | Tommasi | Feb. 25, 1919 |
| 1,554,854 | Hubmann | Sept. 22, 1925 |
| 1,759,453 | Haug | May 20, 1930 |
| 1,799,177 | Perry | Apr. 7, 1931 |
| 1,836,659 | Gordon | Dec. 15, 1931 |
| 1,993,478 | Graham | Mar. 5, 1935 |
| 2,021,690 | Kaufman | Nov. 19, 1935 |
| 2,073,039 | Wilton | Mar. 9, 1937 |
| 2,086,778 | Peffer | July 13, 1937 |
| 2,088,814 | Schmalenbach | Aug. 3, 1937 |
| 2,090,143 | Monhebel | Aug. 17, 1937 |
| 2,142,747 | Fisher | Jan. 3, 1939 |
| 2,155,853 | Anthony | Apr. 25, 1939 |
| 2,166,397 | Deverall | July 18, 1939 |
| 2,214,932 | Merlis | Sept. 17, 1940 |
| 2,311,625 | Bransky et al. | Feb. 23, 1943 |
| 2,365,868 | Franchot | Dec. 26, 1944 |
| 2,577,720 | Waller | Dec. 4, 1951 |

FOREIGN PATENTS

| Number | Country | Date |
|---|---|---|
| 16,963 | Great Britain | of 1908 |
| 16,855 | Great Britain | of 1912 |